United States Patent [19]

Fulkerson

[11] 4,074,104

[45] Feb. 14, 1978

[54] OPTO-ELECTRONIC POSITION SENSING METHOD

[75] Inventor: Emmet M. Fulkerson, Cincinnati, Ohio

[73] Assignee: General Electric Company, Cincinnati, Ohio

[21] Appl. No.: 681,737

[22] Filed: Apr. 29, 1976

Related U.S. Application Data

[62] Division of Ser. No. 534,552, Dec. 19, 1974, abandoned.

[51] Int. Cl.² .............................................. B23K 9/00
[52] U.S. Cl. .......................... 219/121 LM; 73/432 L; 73/DIG. 11; 219/121 EM; 250/492 B; 346/76 L
[58] Field of Search ..... 219/121 LM, 121 L, 121 EB, 219/121 EM; 73/432 L, DIG. 11; 250/492, 560; 356/156, 209, 199

[56] References Cited

U.S. PATENT DOCUMENTS

| | | | |
|---|---|---|---|
| 3,016,464 | 1/1962 | Baily | 219/121 L |
| 3,283,120 | 11/1966 | Spruck | 219/121 EB |
| 3,387,109 | 6/1968 | Bruma et al. | 219/121 L |
| 3,467,099 | 9/1969 | Lotmar | 219/121 LM |
| 3,667,846 | 7/1972 | Nater et al. | 356/156 X |
| 3,671,726 | 6/1972 | Kerr | 356/156 X |
| 3,689,159 | 9/1972 | Taniguchi | 219/121 L X |
| 3,821,558 | 6/1974 | Mansfield | 356/156 X |
| 3,903,392 | 9/1975 | Konig et al. | 219/121 EM |

OTHER PUBLICATIONS

IBM Disclosure — Microprinter for wafer or chip identification — Schaedlich — 1-1973.

*Primary Examiner*—J. V. Truhe
*Assistant Examiner*—Mark H. Paschall
*Attorney, Agent, or Firm*—Lee H. Sachs; Derek P. Lawrence

[57] ABSTRACT

An opto-electronic apparatus for sensing the position or inspecting the condition of a target, which is capable of at least partially reflecting light in a scattered manner, includes an incident light source and means to direct light from the source in a narrow incident beam onto the target along an incident beam axis. A photoelectric sensor, which includes light collecting and focusing means as well as photosensitive means for receiving the focused light, provides for collecting and focusing the reflected scattered light along a reflected light axis of the light collecting and focusing means to the photosensitive means which provides an output signal including a portion which is a function of displacement of the focused light from a reference of the photosensitive means. Such reference represents the position of the axis intersection between the incident beam axis and the reflected light axis of the light collecting and focusing means. Also included in the apparatus is sensing means responsive to the output signal of the photosensitive means to sense displacement of the target, along the incident beam axis, in respect to the axis intersection.

3 Claims, 8 Drawing Figures

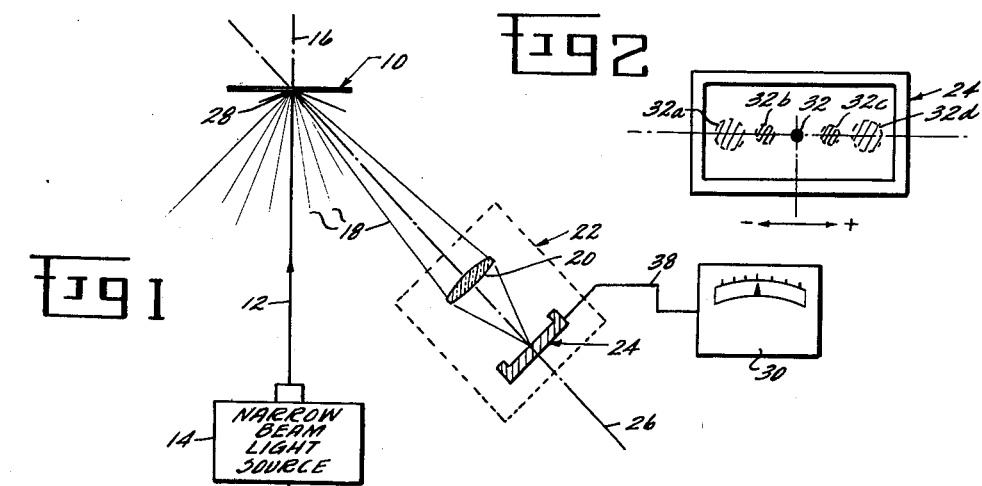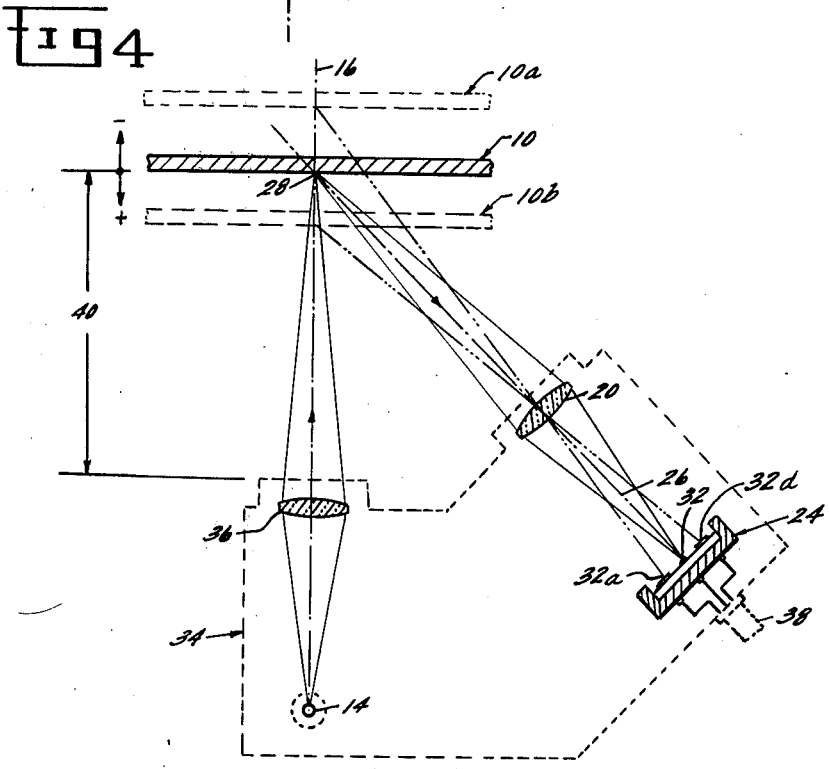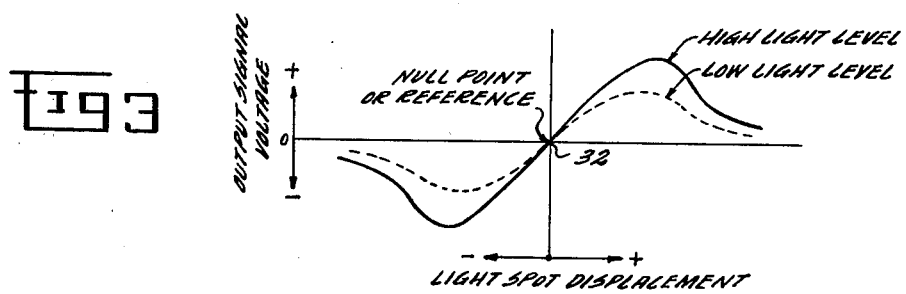

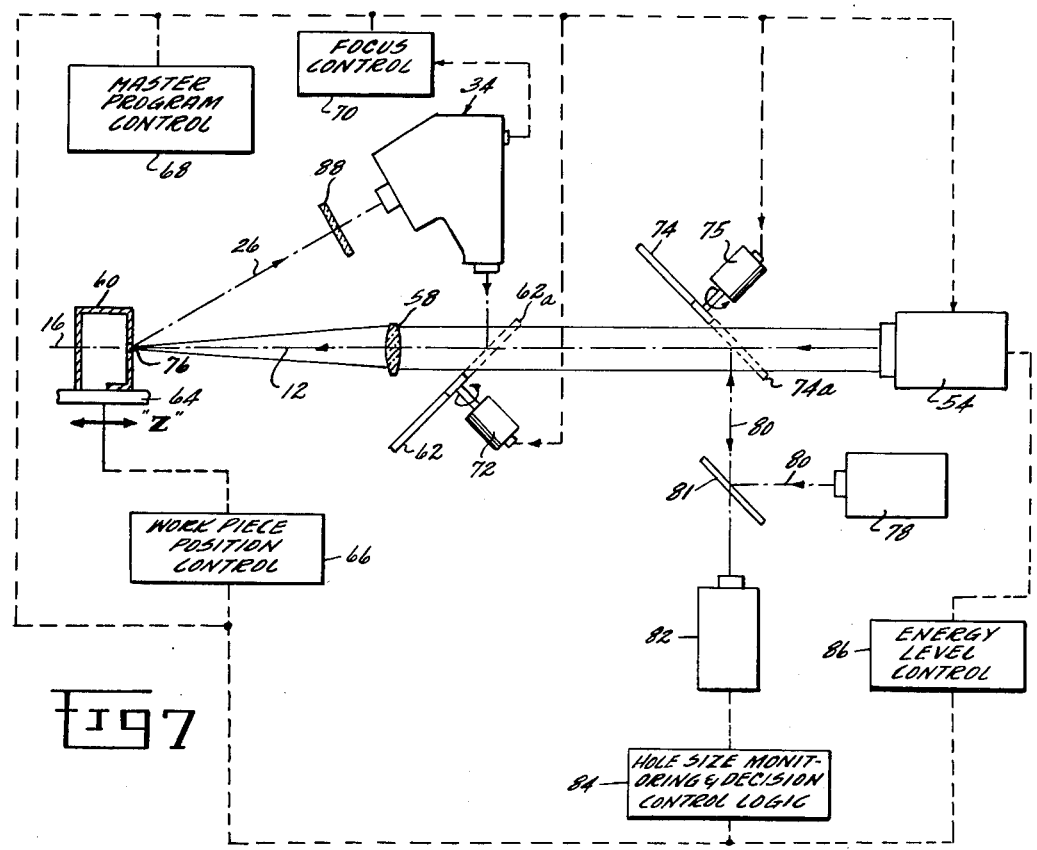
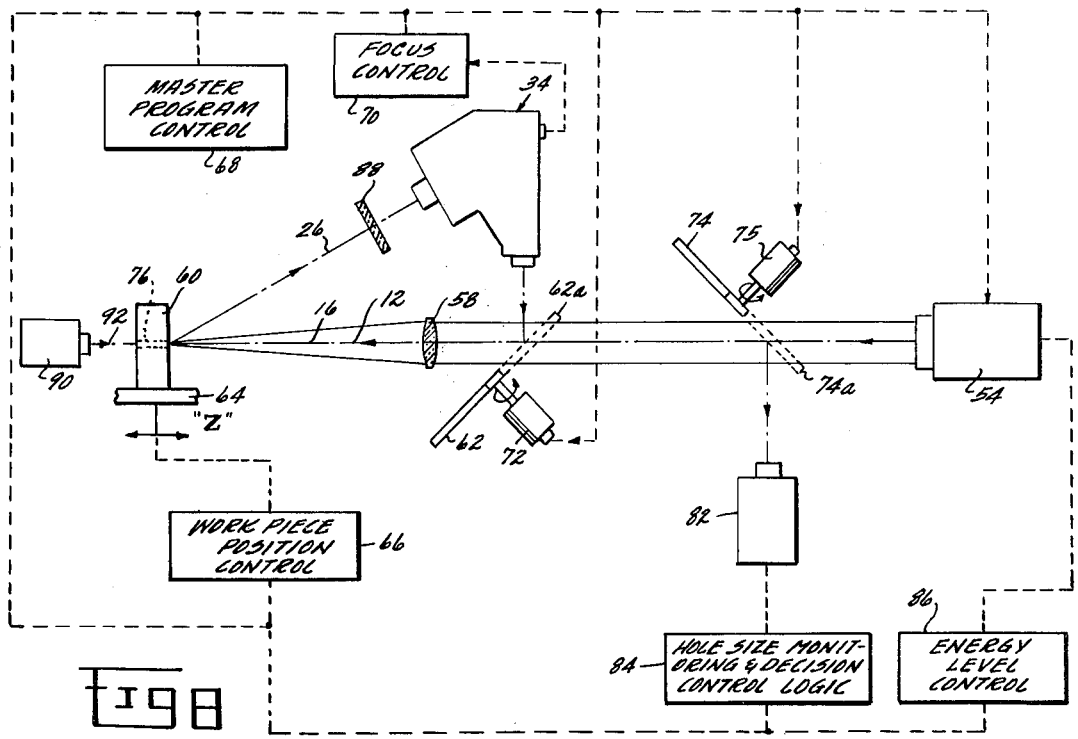

OPTO-ELECTRONIC POSITION SENSING METHOD

This is a divisional of application Ser. No. 534,552, filed Dec. 19, 1974 now abandoned, and is assigned to the assignee of the present invention.

BACKGROUND OF THE INVENTION

This invention relates to an apparatus and method combining optical and electronic devices, which can include laser apparatus, for position sensing and inspection of a target such as a workpiece.

The invention herein described was made in the course of or under a contract, or a subcontract thereunder, with the Unites States Department of the Air Force.

A wide variety of methods and apparatus for performing a function which can generally be referred to as range or position finding have been reported in various forms of the literature. An important application for such apparatus, and one in which the present invention is particularly useful, involves the location and inspection of a workpiece in connection with which it is desired to control a metal removal tool. Such tools can include laser apparatus, for example, to drill, melt, cut or otherwise operate on a workpiece, as well as a variety of mechanical metal removal tools such as grinders, cutters, drills, etc. Other forms of such range finding apparatus have been applied to non-material removal apparatus such as the automatic focusing photographic slide projectors.

One type of apparatus, the operational performance of which is improved through the use of the present invention, is shown in Duston et al — U.S. Pat. No. 3,806,829. That reference contains a detailed description of a four-axis numerically controlled workpiece support as well as other automatic or programmed features and functions which constitute a typical complete laser drilling or welding system. However, no provision is made for automatic focus finding or hole inspection methods.

Taniguchi et al — U.S. Pat. No. 3,689,159 disclose a laser apparatus for automatically shaping a workpiece. A monitor light, separate from the shaping laser, is directed toward and reflected from the workpiece along the same axis as is the shaping laser, the relfected light being directed to a light detector through a vibrating plate for positioning control. However, the response and accuracy of such a system is not adequate for such applications as the accurate drilling of small air cooling holes in an aircraft engine component such as turbine blades and nozzles.

Other apparatus, such as that shown in Conner et al — U.S. Pat. No. 3,449,542, employ mirrors or similar devices for reflecting a specular image from a workpiece rather than scattered reflected light from a workpiece in order to provide position control. In the Conner et al apparatus, laser drilling point variations are controlled by deflecting the laser beam on the workpiece. Other devices such as that of Chiou et al — U.S. Pat. No. 3,485,996 depend on a difference in reflected light brightness or intensity reflected from the workpiece back along the incident beam for sensing different materials and triggering laser operation.

The disclosures of each of the above-mentioned patents are incorporated herein by reference.

SUMMARY OF THE INVENTION

It is a principal object of the present invention to provide an improved apparatus having enhanced sensitivity and repeatability, particularly for production applications, for position sensing and inspection of a target such as a workpiece.

Another object is to provide such apparatus employing optical and electronic components which enable the apparatus to be readily adapted for control of, and inspection in connection with, material removal apparatus.

Still another object is to provide an improved method for the opto-electronic position sensing of a target such as a workpiece.

A further object is to provide an improved opto-electronic method for the inspection of a target such as a workpiece or a hole in the workpiece.

These and other objects and advantages will be more clearly understood from the following detailed description, the drawings and the examples, all of which are intended to be typical of rather than in any way limiting on the scope of the present invention.

The above objects can be achieved and the shortcomings of the prior art apparatus and methods can be avoided through the present invention. In its apparatus form, it senses the position of a target capable of at least partially reflecting light in a scattered manner through use of an incident light source and means to direct light from the light source in a narrow incident light beam onto the target along an incident beam axis. The apparatus includes a photoelectric sensor which comprises light collecting and focusing means and photosensitive means for receiving the focused light. The light collecting and focusing means collects scattered light reflected from a spot on the target produced by the incident beam and focuses the scattered light along a reflected light axis which is other than along the incident beam axis, thus establishing an axis intersection between the reflected light axis and the incident beam axis. The photosensitive means receives the focused light and provides an output signal including a portion which is a function of displacement of the focused light from a photosensitive means reference representing the position of the axis intersection. Included is sensing means, responsive to the output signal of the photosensitive means, to sense displacement of the target, along the incident beam axis, in respect to the axis intersection through the output signal. In this way, improved accuracy and sensitivity can be provided in the location of the exact position of the axis intersection and hence the exact position of a target such as a workpiece.

In the method associated with the present invention, a narrow incident beam is directed along an incident beam axis onto the target. Light, reflected and scattered by the target, is collected from a position other than on the incident beam axis and is focused on a photosensitive means along a reflected light axis which intersects the incident beam axis at an axis intersection. The photosensitive means provides an output signal including a portion which is a function of displacement of the focused light from a reference of the photosensitive means representing that axis intersection. Then the position of the target along the incident beam axis is sensed in respect to the axis intersection through the output signal.

The present invention, which includes apparatus not required to contact the workpiece and includes components which are protectible from expulsed material particles in material removal applications, is a system having high sensitivity and resolving power. In addition, it is compatible with conventional material removal, such as laser, numerical control machine logic and controls.

BRIEF DESCRIPTION OF THE DRAWING

FIG. 1 is a schematic representation of one form of the apparatus of the present invention;

FIG. 2 is a diagrammatic view of the photosensitive surface of the photosensitive means receiving collected, focused light;

FIG. 3 is a graphical representation of the output characteristics of the photosensitive means;

FIG. 4 is a diagrammatic, partially schematic presentation of an integrated assembly of components of the present invention;

FIG. 7 is a schematic representation of one embodiment of the present invention showing the combination of laser hold drilling and blind hole inspection and control; and FIG. 8 is a schematic representation of another embodiment of the present invention showing the combination of laser hole drilling and through hole inspection and control.

DESCRIPTION OF THE PREFERRED EMBODIMENTS

Figure 5:
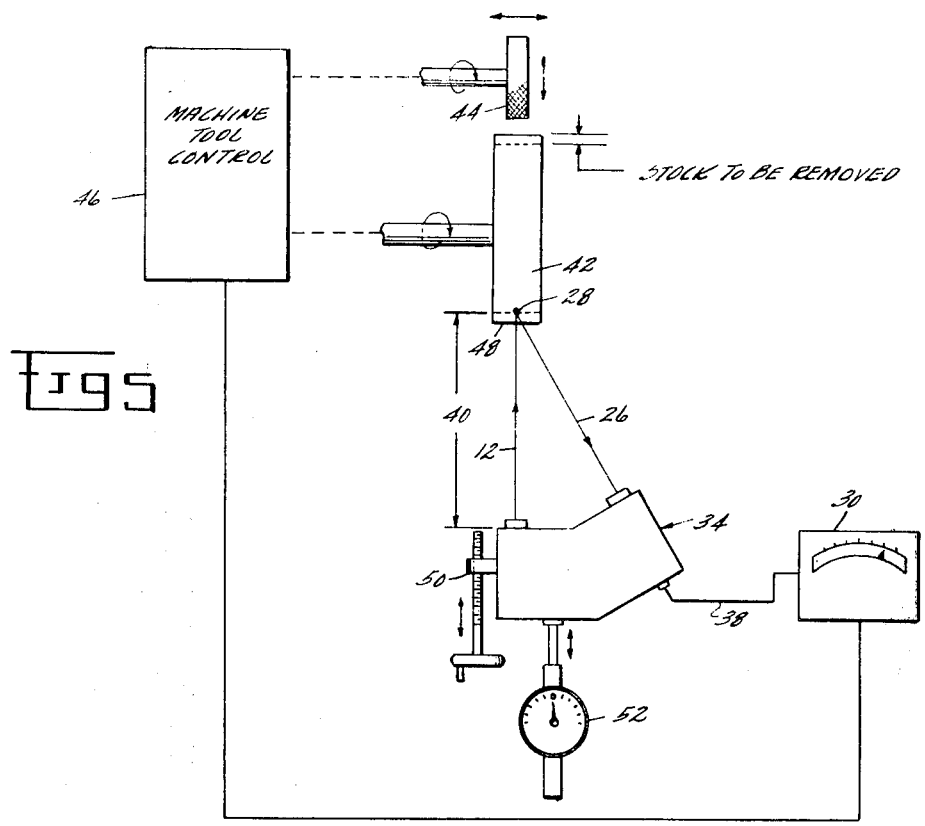
FIG. 5 is a diagammatic view of application of the present invention with a grinding tool.

During evaluation of high speed laser drilling machines for use in the generation of small air cooling holes in turbine blade and nozzle components for gas turbine engines, shortcomings were recognized in the use of current systems for article positioning and process commands necessary for high rate, accurate hole generation. The present invention overcomes shortcomings of present automatic hole drilling and inspection apparatus, improving accuracy and process repeatability for production applications. However, it should be understood that, although the present invention will be described in connection with material removal apparatus, and particularly in connection with laser drilling, there are a variety of applications for the position sensing, the inspection and other features of the present invention.

With reference to FIG. 1, it has been recognized, through the present invention, that very accurate sensing of the position of a target 10, capable of at least partially reflecting light in a scattered manner, can be accomplished by directing a narrow beam of light 12 from an incident light source 14, for example a point source light, onto the target along an axis 16 which is herein called an incident beam axis. A portion of the scattered light 18 reflected by target 10 is collected by a light collecting and focusing means 20, such as a lens, of photoelectric sensor shown generally at 22. Light collecting and focusing means 20 focuses the collected light toward a photosensitive means 24 along a reflected light axis 26 which is positioned other than along the incident beam axis 16. Thus, there is created an axis intersection 28, shown in FIG. 1 to be positioned on the surface of target 10. The position of axis intersection 28 in respect to incident beam 12 and photoelectric sensor 22 establishes a reference point in space which can be used to determine the position of target. Through this arrangement, the change in position of target 10 along incident beam axis 16 will cause movement of a light spot image across the photosensitive portion of photosensitive means 24. The size of such spot of light is a function of the size of the beam and hence the beam spot on the surface of target 10. Photosensitive means 24 generates an output signal to which sensing means 30 is responsive, locating the position of target 10 in respect to axis intersection 28 through the output signal of photosensitive means 24. Accordingly, a very small change in position of target 10 along incident beam axis 16 relative to axis intersection 28 can generate a relatively large change in position of the reflected, collected spot image on photosensitive means 24. This kind of sensitivity and accuracy is not available in known apparatus which merely reflects a mirror image of a spot or collects reflected light from a target back along the incident beam axis for various types of sensing either as to spot size or reflected light intensity.

As has been mentioned, the output signal from photosensitive means 24 includes a portion which is a function of the displacement of focused light from a reference, such as a reference point or small area of the photosensitive means. Such a reference represents, on the photosensitive means, the position of axis intersection 28. FIG. 2 is a diagrammatic representation of one form of a photosensitive surface of photosensitive means 24. The reference or center null point is shown at 32 with typical displaced light spot images shown in phantom at 32a, 32b, 32c and 32d away from the reference 32. Displacement to one side or the other of the reference, null or center point 32 is indicated by a positive or negative output signal indicating the position of target 10 in respect to the axis intersection 28, either behind or in front of axis intersection 28 along incident beam axis 16, depending on the electrical arrangement of the sensing circuitry.

As is noted from FIG. 2, as the target becomes further displaced along incident beam axis 16 from axis intersection 28, the size of the image increases and appears less intense than at the reference or null point 32, although the total amount of light falling on the surface is the same from position to position. The present invention determines that the target is on or away from the axis intersection 28 by the displacement of the image from the reference rather than the light intensity. Of course, the higher the light level, the greater will be the sensitivity of the measurement. This is shown by the graphical representation of the output characteristics of the photosensitive means 24 of the photoelectric sensor 22. The output signal of the photosensitive means or photodetector 24 is proportional to the reflected light intensity and to the displacement distance of the light spot image from the electrical center or null point of the photosensitive surface. The output signal polarity identifies the direction of the target surface motion required to approach the null position. Variations in output signal level, due to variations in reflected light intensity, influence the null finding sensitivity without affecting actual null position. Further, it should be noted that the output signal level is not affected by changes in image size due to the out-of-focus conditions. However, in order to enhance null sensing resolution, it is desirable to arrange the optical elements employed in the present invention so that a minimum projected spot size on the target surface and a minimum focused spot image on the photosensitive means occur simultaneously whenever null position requirements are satisfied. It should be understood that the output signal of the photosensitive means 24 does not identify the location of the target surface directly. Such a location is identified by measuring the relative change in distance between the target and the axis intersection 28 to achieve the nulled condition. For example, the target can be moved along incident beam axis 16 or the apparatus can be moved to move the axis intersection toward or away from the target along incident beam axis 16. Thus, the position, at null, of the target surface light spot establishes a known point to which other target surface positions can be referenced.

It will be appreciated that the distance between the target and the components of the present apparatus, including the light source 14 and the photoelectric sensor 22, can be predetermined by a suitable arbitrary fixed angular relationship between the incident beam axis 16 and the reflected light axis 26, depending on the desired application. A diagrammatic, partially schematic view of an integrated assembly of components of the present invention is shown in FIG. 4. Such an assembly 34, which can be referred to as an integrated probe assembly, includes point light source 14 which is focused into a narrow incident beam 12 through a spot projection lens 36. As will be discussed later, the incident beam 12 can be generated by a laser of less than material removal intensity. The combination of point light source 14 and projection lens 36 directs incident beam 12 along incident beam axis 16.

Also included in the integrated probe assembly 34 is a light collecting and focusing means 20 shown in the form of a lens, positioned other than along the incident beam axis 16 to collect and focus light reflected from target 10 along a reflected light axis 26 toward photosensitive means 24. Shown in phantom in FIG. 4 are two alternate positions of target 10, shown as 10a and 10b, away from axis intersection 28 which is represented on photosensitive means 24 by reference or null point 32. Spot positions 32a and 32d, as shown in FIG. 2, represent the collected and focused spot images of incident beam 12 on target 10a and 10b, respectively. The output signal from photosensitive means 24 is passed, such as through electrical conductor 38, to a sensing means or null sensing circuitry for a variety of purposes such as operating material removal equipment, measuring position, etc. As was mentioned before, the integrated probe assembly stand-off distance, represented by distance 40 in FIG. 4, in respect to axis intersection 28 is arbitrary and the angular relationship between incident beam axis 16 and reflected light axis 26 can be selected for a given application.

The basic concept of the present invention is compatible with most high speed machining control systems. The photosensitive means such as photodetector 24 response time permits photosensitive means output signal sensing rates of over 1 million per second. It should also be noted that the nature of the reflected light which the photosensitive means 24 receives is more scattered than specular, a characteristic of the present invention which has a leveling effect on surface reflectivity variations. This feature of the present invention contrasts directly with those types of apparatus based on the principle of reflecting a light source from a highly reflective, mirror-like reflecting surface to a sensor. In such known apparatus, the angle of incidence and the angle of reflection, whether it be from a light source to the mirror-like reflecting surface to the sensor or from the target to a mirror to a sensor, are substantially equal angles and the sensor responds only to shifting specular images. By way of contrast, in the present invention where the angle of incidence is not required to be equal to the angle of reflection, although in some configurations it may be convenient to be so, a target with a mirror-like surface cannot be sensed reliably. Some surface roughness or dullness is necessary to provide a degree of incident light scattering. The duller the surface, the better the sensing. In addition, the viewing range and sensitivity of the sensor in the arrangement of the present invention is enhanced by its optical magnification and its angular position relative to the incident beam axis along which the incident beam travels toward the target. Thus, the sensor and the integrated probe assembly in which it can be included can be positioned at whatever distance is desired from a target with the narrowness of the incident light beam and the angular relationship between the incident beam axis and the reflected light axis providing the desired sensitivity. Generation of a small spot on the target is most conveniently provided by use of a laser as a light source of an intensity less than that which will in any way melt, decompose or degenerate the target material.

One application of the present invention is in connection with mechanical material removal tools and apparatus. One such arrangement is shown in the diagrammatic view of FIG. 5 in connection with a rotating material removal tool such as a grinding wheel. In FIG. 5, workpiece 42 and grinding wheel 44 are shown to be positioned one with respect to another in the manner normally used in connection with mecahnical grinding apparatus. The arrows associated with the grinding wheel and the workpiece are intended to indicate the normal freedom of movement or rotation provided by such apparatus. The present invention can be used to operate machine tool control 46 as a function of sensing means or null indicator 30 sensing the position of workpiece surface 48 in respect to axis intersection 28. Axis intersection 28 is adjusted such as through a movement means represented by crank means 50, which could also be one of a variety of devices such as a preprogrammed automatic servo control, to move probe assembly 34 toward or away from workpiece 42 along incident beam axis 16 to place axis intersection 28 within workpiece 42 at a depth to which material is to be removed from the workpiece. Such a depth can be indicated on probe position indicator 52.

With the apparatus so adjusted, sensing means or null indicator 30 will sense that the axis intersection 28 is not on surface 48 of the workpiece. The machine tool control 46 is adapted to be started and to operate to remove workpiece material until the control receives a signal from sensing means 30 that workpiece surface 48 coincides with axis intersection 28. At that time, operation of grinding wheel 44 is terminated in respect to workpiece 42. In this way, machine tool control 46, in cooperation with the apparatus of the present invention including the components of the position sensing probe and the sensing means, can automatically control material removal from workpiece 42 with great accuracy and efficiency. This arrangement of the present invention is similar to that which can be used in connection with a lathe or other turning apparatus.

Previously machined surfaces or diameters can be inspected such as with the embodiment of FIG. 5 by bringing about a zero or null reading on sensing means 30 and determining the dimension desired by reading the probe position indicator 52. In connection with those types of material removal methods involving tools which perform direct drilling or boring into a workpiece, an arrangement can be provided whereby the workpiece or the material removal tool is translated during appropriate intervals from their juxtaposition to a position where the workpiece is associated with the apparatus of the present invention.

The present invention has been extensively evaluated and applied in connection with the laser driling of holes in a metallic workpiece. The geometry and quality of laser drilled holes are influenced by a number of process variables including the distance between a drilling lens focal point and the workpiece surface. The smallest holes are generated at the focal point, with holes of increasing size being generated as the workpiece departs from the focal point. Other variables are either selected to form the laser optics, such as focal length of lenses and aperture diameters, or are under system control, such as charge level, pulse length, pulse rate and number of pulses. The distance between the drilling laser beam focal point and the workpiece surface, sometimes referred to as the "focus offset" is dependent on workpiece surface dimensional variations which usually are governed by tolerances selected to meet the functional requirements of the components. While workpiece table positions are programmed for nominal workpiece shapes, variations of the workpiece surfaces from their nominal shapes change the amount of focus offset. This in turn can cause hole geometry variations beyond allowable limits. In order to overcome this problem, the present invention achieves the desired focus offset prior to each drill pulse.

Figure 6:
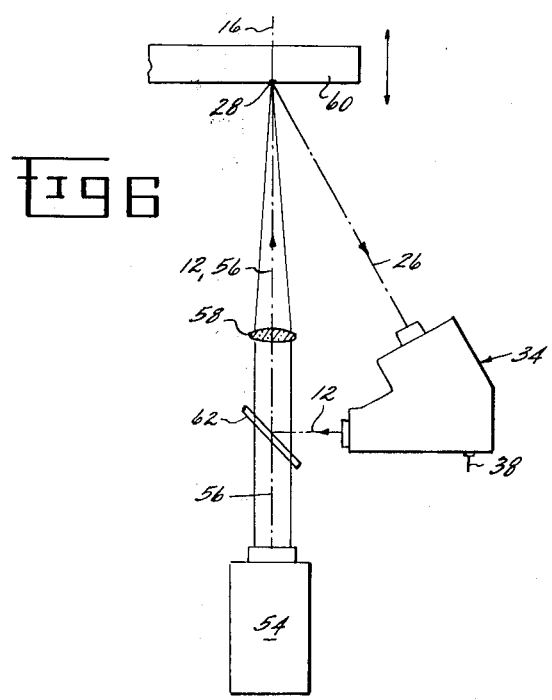
FIG. 6 is a schematic representation of one embodiment of the present invention for application with laser apparatus for drilling, welding, etc.

In accordance with the present invention wherein the incident beam axis is made to coincide with the axis of the laser drilling beam, for example in the embodiment of FIG. 6 by projecting both through the same optics, both the incident light beam and the drilling laser beam are focused on the workpiece surface in the same position as the workpiece surface moves along the incident beam axis, which is also the axis of the drilling laser. Scattered light reflected from the workpiece 60 toward light collecting and focusing means focusing on the photosensitive means of assembly 34 causes movement of such focused light on the photosensitive means as a function of the relative position of the drilling laser beam focal point to the workpiece surface. One type of such photosensitive means 24, shown in more detail in FIG. 4 and commercially available from United Detector Technology Company as Model SC/10, or equivalent, is suitable to generate electrical signals in proportion to the displacement of the light spot image from a null position, generating a plot similar to that shown in FIG. 3.

In such a system, the magnitude of the signal generated also is proportional to the light intensity reaching the sensor surface. Although this characteristic does not directly affect the null or zero signal position, it does determine system sensitivity or resolving power. By combining a good quality large aperture lens, such as a coated acromatic lens, with a small helium/neon gas laser, such as Type 133 manufactured by Spectra/Physics Inc., or equivalent, as the light source, acceptable system sensitivity is provided for a wide range of surface reflectivities.

One embodiment of the present invention for use in connection with laser apparatus for drilling, welding, cutting, etc., is shown in the schematic representation of FIG. 6. Therein, a probe assembly 34, similar to that shown in detail in FIG. 4, can be used with a slight modification which will be described later. In connection with this embodiment, the incident light source 14 generating an incident beam 12 will be described as a laser of an intensity less than that which will detrimentally affect the workpiece material. However, it should be understood that any light source capable of generating a narrow beam for projection of a spot onto a target or workpiece surface can be used.

In FIG. 6, a first laser means, such as laser beam generator 54, as adapted to emit a first laser beam 56 of working intensity. As used herein, the term "working intensity" is intended to mean of an intensity sufficient to perform the desired operation on the workpiece, for example drilling, welding, machining, etc. A focusing lens 58 is positioned to focus beam 56 toward workpiece 60. Positioned between first laser means 54 and focusing lens 58 is a movable mirror or fixed beam splitter 62 adapted to allow first laser beam 56 to pass toward the workpiece and as well as to reflect an incident beam 12 from probe assembly 34 toward focusing lens 58. Thus, both the incident beam 12, which in FIG. 6 is a second laser beam, and first laser beam 56 are projected along incident beam axis 16 toward the workpiece. In the arrangement of FIG. 6, wherein the incident beam and the working laser beam are directed toward the workpiece through the same optics and along the same axis, probe assembly 34 is slightly modified over the arrangement shown in FIG. 4 by directing the incident beam 12 toward a device 62 such as a mirror which reflects the incident beam from a position away from incident beam axis 16 along that incident beam axis. If a mirror is used, it is preferably movable out of the line of incident beam axis 16 to avoid any modification of first laser means 54 when it pulses to direct the first laser or working beam 56 toward the workpiece through the lens means 58.

Thus, in a laser machining application of the present invention, as represented by the embodiment of FIG. 6, the incident beam is aligned coaxially with the working laser beam by suitable beam diverting means. Whenever working laser beam focusing optics are utilized, they also can serve as focusing means for the incident beam, which is preferably a laser beam but can be any narrow beam which focuses a spot on the target. The arrangement is fixed so that the incident light spot is in exact coincidence with the focal point of the working laser beam whenever the target surface is in the reference or nulled position. In one completely automated system, a programmed focus command results in the workpiece being moved along the incident beam axis which is also the axis of the working laser beam until the sensing means indicates through the photosensitive means output signal that the reference point has been reached. Thus is established a datum point to which subsequent target surface positions may be referenced. The distance between the focal point of the focusing optics through which both the laser beam and the incident beam pass, and the workpiece target surface then is adjusted in a preselected manner for process control purposes, for example to control the size of a laser-drilled hole.

As has been indicated above, the present invention can be used to inspect the dimensions of a target. Another embodiment of the present invention includes apparatus for inspecting a hole in a workpiece by projecting an inspection light to illuminate the hole thus, to produce a hole image which can be measured by a photoelectric image scanner. Such an embodiment is shown in the schematic representation of FIG. 7 combining laser hole drilling and control with subsequent hole inspection.

During operation of the apparatus embodiment of FIG. 7, a workpiece 60, shown to be a two-walled member, is mounted on a holding means such as machine table 64 which is positioned for drilling of desired hole patterns. Although most laser drilling machines utilize four axis N/C positioning, only the "Z" axis, or focusing axis, is shown for simplicity in the drawing. A workpiece position control 66, which can include automatic position control mode selectors, digital counters, appropriate motors and other components normally used in the art, under the direction of master program control means 68 moves the workpiece along the "Z" axis into nominal target position. Focus control means 70 directs the workpiece to move into exact coincidence with the focal point of focusing lens 58 which focal point is the axis intersection 28 between incident beam axis 16 and reflected light axis 26. During the above-described operation, mirror actuator 72, for example of the electromechanical type, has positioned a first mirror 62 to the position shown in phantom as 62a with a second mirror 74 conveniently located by mirror actuator 75 at the position shown at 74. In this configuration, incident beam 12 is reflected from mirror at 62a through lens 58 whereby it is focused on workpiece 60. It is then scattered and a portion is collected along reflected light axis 26 in the manner previously described in connection with probe assembly 34.

First the target surface of workpiece 60, which can be, for example, a turbine nozzle component made of a high temperature resistant alloy, is brought to the focal point of lens 58 which is also the axis intersection of incident beam axis 16 and reflected light axis 26. Then, the workpiece is moved through workpiece position control 66 and master program control means 68 to whatever drilling offset distance is desired to achieve the selected hole size. Mirror at 62a is then moved by actuator 72 from its position at 62 out of the incident beam axis and laser beam generator 54 is actuated to direct a working laser beam through lens 58 toward workpiece 60 for the purpose of drilling a hole 76 through workpiece 60.

In order to inspect the hole drilled through workpiece 60, second mirror actuator 75 moves mirror 74 to the position shown in phantom at 74a. Then inspection light source 78 directs an inspecting light beam 80 along incident beam axis 16 by means of partially silvered or partially reflective mirror 81 and mirror at 74a to illuminate hole 76. Such illuminating light, reflected from the hole, is collected by lens 58 which directs the collected image of hole 76, by means of mirror at 74a through partially reflective mirror 81 to image scanner 82, for example of the Type 50B manufactured by Dicomed Corporation, or its equivalent. Hole size measurements are accomplished by applying electronic scanning which determines the area of the optically magnified hole image.

An embodiment of the present invention for inspecting a hole in a workpiece is shown in FIG. 8, similar to that of FIG. 7. In this example in FIG. 8, hole 76 penetrates through workpiece 60. After generation of hole 76 through workpiece 60 as in FIG. 7, and mirror 62 out of aligment with incident beam axis 16, second mirror actuator 75 positions mirror 74 at the location shown in phantom at 74a. An inspection light 90 directs an inspecting light beam 92 through hole 76 along axis 16 and through lens 58. The beam is then reflected by the mirror at 74a to image scanner 82 for evaluation and use as has been described in connection with the embodiment of FIG. 7.

Because the inspection mode, through the use of the present invention, has been conducted immediately after a hole has been drilled and prior to repositioning of the workpiece through master program control means 68 and workpiece control means 66 for generation of a new hole in a sequence, hole size variations which might result from the variations of the workpiece surface or charge level changes in the first laser means output energy can be corrected. Such correction can be made for example through a hole size monitoring and decision control logic means 84 in FIGS. 7 and 8 directing master program control means 68 either to change the energy level of first or working laser means 54 such as through an energy level control 86, or it can provide appropriate focus offset correction through operation of workpiece position control 66 or focus control 70 or both.

Although the embodiments of FIGS. 7 and 8 have been described in connection with a stationary probe assembly 34 and a movable workpiece 60, which is the most convenient production arrangement, it should be understood that probe assembly 34 or various components thereof can be movable as well to accomplish the same purpose of focus control on the workpiece. If desired, there can be introduced along reflected light axis 26 a filter 88 for ambient light rejection to enhance the sensitivity of the system. Also, probe assembly 34 and focusing lens 58 can be positioned at a sufficient distance from the workpiece surface to allow placement of protective materials between the workpiece and the sensor optics to protect the optics from expulsed workpiece material. One protective material which has been found to be useful in this regard is a Mylar plastic film sufficiently transparent to allow passage of the various light beams used.

Electronic scanning methods for hole size inspection available prior to the present invention have shortcomings because they also were dependent on the relative position of the workpiece surface to the scanning optics. Variations of the workpiece surface introduced measurement errors beyond permissible limits. However, when the combination of the electronic scanning and electro-optical focusing control were combined in the present invention, the measurement repeatability was significantly enhanced, making the apparatus and method appropriate for on-line production inspection of laser drilled holes and for adaptive control of the laser process.

From the above description and the typical examples of several embodiments of the present invention, it will be appreciated by those skilled in this art that a valuable and unique adaptive control and inspection apparatus and method have been defined. The design features lend themselves to high-speed operation and compatibility with conventional laser machine numerically controlled logic and controls. Other modifications of the invention will suggest themselves to those skilled in the art in view of the above descriptions, for example, in respect to the various incident light sources which might be used, the means to direct such light in a narrow beam toward the workpiece, the type of photoelectric sensor components, the various sensing means and means to focus, divert, collect and otherwise handle the light beams utilized in connection with the present invention.

All such modifications which do not depart from the spirit and scope of the invention, as pointed out in the appended claims, are contemplated.

What is claimed is:

1. A method for removing a predetermined depth of material from a workpiece target capable of at least partially reflecting light in a scattered manner, through the application of a material removal tool, wherein a narrow incident beam is directed along an incident beam axis onto the target, scattered light from the incident beam reflected from the target is collected from a position other than on the incident beam axis along a reflected light axis which intersects the incident beam axis at an axis intersection, the scattered light being focused on a photosensitive means which provides an output signal including a portion which is a function of displacement of the focused light from a reference of the photosensitive means representing the axis intersection, the improvement comprising the steps of:

positioning the axis intersection within the workpiece beneath the target at a predetermined distance which is related to the amount of material to be removed by the material removal tool; and then operating the tool to remove material from the workpiece until the focused light approaches a preselected position in respect to the reference of the photosensitive means as a function of the approach of the incident beam to the axis intersection.

2. A method for drilling a hole in a workpiece target capable of at least partially reflecting light in a scattered manner, wherein an incident laser beam of less than drilling intensity is directed along an incident beam axis onto the target through an incident beam focusing means, scattered light from the incident beam reflected from the target is collected from a position other than on the incident beam axis along a reflected light axis which intersects the incident beam axis at an axis intersection, the scattered light being focused on a photosensitive means which provides an output signal including a portion which is a function of displacement of the focused light from a reference of the photosensitive means representing the axis intersection, the improvement comprising the steps of:

positioning the axis intersection and the target at a preselected position with respect to one another along the incident beam axis by first positioning the axis intersection on the target and then moving the axis intersection a preselected distance along the incident beam axis to adjust the size of the hole to be drilled in the target; and then directing a drilling laser beam of drilling intensity through the incident beam focusing means toward and into contact with the target along the incident beam axis for a time sufficient to remove desired material from the target.

3. The method of claim 2 including the additional steps projecting an inspecting light along the incident beam axis to illuminate the hole;

collecting inspecting light reflected from the hole and focusing the collected light along the incident beam axis as a hole image;

scanning the area of the hole image to inspect the hole; and then modifying the relative position of the workpiece target and the axis intersection to reduce any difference between the area of the hole and a preselected hole image area.

* * * * *